United States Patent [19]

Johnson et al.

[11] Patent Number: 4,567,237

[45] Date of Patent: Jan. 28, 1986

[54] ETHYLENICALLY UNSATURATED POLYESTERS

[75] Inventors: Gilbert C. Johnson, Lino Lakes; Heather V. Landin, St. Paul, both of Minn.

[73] Assignee: Minnesota Mining and Manufacturing Company, St. Paul, Minn.

[21] Appl. No.: 673,870

[22] Filed: Nov. 21, 1984

[51] Int. Cl.$^4$ .......................... C08F 8/00; C08L 67/00
[52] U.S. Cl. ..................................... 525/170; 525/111; 525/112; 525/168; 528/303; 528/393
[58] Field of Search ............... 525/168, 170, 111, 112; 528/303, 393

[56] References Cited

U.S. PATENT DOCUMENTS

| | | | |
|---|---|---|---|
| 3,256,226 | 6/1966 | Fekete et al. | 260/23 |
| 3,674,727 | 7/1972 | Fekete et al. | 528/303 X |
| 3,847,770 | 11/1974 | Radlowe et al. | 104/159.23 |
| 4,233,425 | 11/1980 | Tefertiler et al. | 525/455 |
| 4,264,748 | 4/1981 | Oriel et al. | 525/109 |
| 4,309,529 | 1/1982 | Wendling | 528/289 |
| 4,316,952 | 2/1982 | Wendling | 430/285 |
| 4,390,645 | 6/1983 | Hoffman et al. | 528/75 |
| 4,394,491 | 7/1983 | Hoffman | 525/412 X |
| 4,397,993 | 8/1983 | Tefertiller et al. | 525/384 X |
| 4,460,715 | 7/1984 | Hoffman et al. | 524/764 X |

OTHER PUBLICATIONS

Useful Facts & Figures–Reliance Universal Inc. Louisville, Kentucky U.S.A. Dow Chemical Company Product Bulletin, "Development Monomer XAS-10743.00, Isocyanatoethyl Methacrylate, C.A.S. No. 030674-80-7".

Primary Examiner—Lucille M. Phynes
Attorney, Agent, or Firm—Donald M. Sell; James A. Smith; Carole Truesdale

[57] ABSTRACT

Ethylenically unsaturated polyesters are provided. These ethylenically unsaturated polyesters are the reaction product of (a) a polyhydroxy polyester material that is the reaction product of at least one organic dicarboxylic acid, at least one diepoxide, and, optionally, monocarboxylic acid and/or monoepoxide with (b) a polymerizable ethylenically unsaturated compound having a functional group reactive with the hydroxyl groups of the polyhydroxy polyester. This product is particularly useful as a protective coating material.

16 Claims, No Drawings

ETHYLENICALLY UNSATURATED POLYESTERS

This invention relates to ethylenically unsaturated polyesters and to radiation polymerizable compositions prepared therefrom. This invention, in another aspect, relates to radiation-polymerized polyester coatings and substrates prepared with such coatings.

Protective coatings for various substrates, such as plastic, wood, and metal, are well-known and a wide variety of different coating compositions have been proposed in the past for such use. Some protective coatings serve a number of different purposes such as providing abrasion and scratch resistance and protection against water spotting and solvent damage. Two important types of protective coatings are lacquer-type or reactive-type coatings.

The lacquer-type coating compositions are provided as a solvent solution of naturally occurring resins or synthetic solid resins. The lacquer-type coating is obtained by coating a substrate with the solution and allowing the solvent to evaporate. The resulting dried coating may, in many examples, be sanded to smooth the surface and correct defects and polished to enhance surface gloss. The coating, even though it may be somewhat abrasion resistant, is still soluble in certain solvents and therefore is readily damaged by solvent.

The reactive-type protective coating compositions contain one or more compounds which contain functional groups, such as ethylenically unsaturated groups, epoxy groups, and isocyanate groups, that react to chain-extend and usually crosslink the compound and form a solid coating. The reaction forming the solid coating can take days, even weeks before the coating becomes hard enough to be handled and shipped without imprinting from adjacent surfaces.

One class of reactive-type coatings are the ethylenically unsaturated polyesters which can be polymerized under the influence of activating energy. For example, Fekete et al. (U.S. Pat. No. 3,256,226) describe hydroxy polyether polyesters having terminal ethylenic unsaturation which are the reaction product of dicarboxylic acids, ethylenically unsaturated monocarboxylic acids, and diepoxide compounds. Radlowe et al (U.S. Pat. No. 3,847,770) describe betahydroxy polyitaconates that are the reaction product of itaconic acid and polyepoxides and which can be copolymerized with polyacrylates. Fekete et al. and Radlowe et al., however, do not teach how to use their reaction product to prepare polyesters that have a sufficient number of ethylenically unsaturated groups to be polymerizable to highly abrasive resistant coating. Wendling (U.S. Pat. No. 4,309,529 and No. 4,316,952) does disclose adducts of diepoxide and itaconic acid that do have a sufficient number of ethylenically unsaturated groups to be polymerizable to highly abrasion resistant coatings but because of the hydrophilic nature of the diepoxide that is used, namely a bisepoxy heterocyclic compound, the coatings obtained tend to be hydrophilic and subject to damage by aqueous substances. Various major coating resins, including polyester coating resins, are described in *Useful Facts and Figures*, 3rd Ed., Technical Publication No. MSB-111-38, Reliance Universal, Inc., Louisville, Ky., pp. 15-18.

Another class of reactive coatings are the urethane polyethers which can be polymerized by actinic radiation and/or chemical initiation. For example, Tefertiller et al. (U.S. Pat. No. 4,233,425) describe addition polymerizable polyethers having a polyether backbone and at least one pendant ethylenically unsaturated aliphatic urethane group, such as the reaction product of a polyether polyol and 2-isocyanatoethyl methacrylate. These coatings may be subject to damage by extended contact with some solvents. Dow Chemical Company product bulletin "Developmental Monomer XAS-10743.00, Isocyanatoethyl Methacrylate, C.A.S. Number 030674-80-7" further describes isocyanatoethyl methacrylate.

In accordance with the invention, ethylenically unsaturated polyesters are provided which, under the influence of activating energy, such as ultraviolet radiation, polymerize to materials which as coatings have excellent solvent resistance, heat resistance, and abrasion resistance as shown hereinafter. Such polyesters are the reaction product of (a) a polyhydroxy polyester material that is the condensation or addition product of at least one organic dicarboxylic acid, at least one organic acyclic or carbocyclic diepoxide and, optionally, monocarboxylic acid and/or monoepoxide, and (b) a polymerizable ethylenically unsaturated compound having a functional group, such as isocyanato (—NCO), reactive with hydroxyl groups of the polyester material (a). The ethylenically unsaturated polyesters can be oligomers which have a number average molecular weight of 500 to 30,000, preferably 1000 to 30,000. The ethylenically unsaturated polyesters of the invention have an ethylenic unsaturation equivalent weight of less than about 330, such ethylenic unsaturation generally being alpha, beta ethylenic unsaturation.

Further provided are coating compositions comprising the above-described ethylenically unsaturated polyester and an amount of a polymerization catalyst sufficient to effectively polymerize the ethylenically unsaturated polyester. There is also provided a process for providing a substrate with a protective coating that is resistant to solvents and abrasion comprising the steps of coating the substrate with a coating composition comprising the ethylenically unsaturated polyester described above and a polymerization catalyst, and curing the applied coating by exposure of the coating to suitable energy.

The ethylenically unsaturated polyesters of the invention are useful, for example, in coatings, adhesives, caulking and sealing compositions, casting and molding compositions, impregnating compositions and binders. These ethylenically unsaturated polyesters are particularly useful in protective coatings because of their excellent abrasion resistance, heat resistance, and solvent resistance.

A class of ethylenically unsaturated polyesters of the invention are those represented by the formula

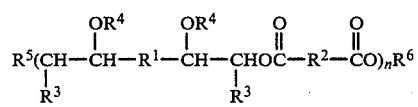

wherein
each $R^1$ and $R^2$ is independently a divalent organic group having 2 to 40 carbon atoms selected from saturated or unsaturated straight or branched aliphatic or cycloaliphatic groups or aromatic groups, the $R^1$ containing no heterocyclic groups, i.e., $R^1$ is acyclic or carbocyclic;

each R³ is independently hydrogen or an alkylene group having 2 or 3 catenary carbon atoms that together with atoms in R¹ and the —CH—CH— group to which it is bonded form a 5- or 6-membered trivalent cycloalkane group;

each R⁴ is independently —H, 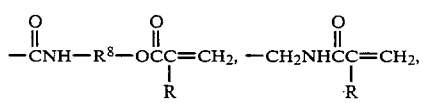,

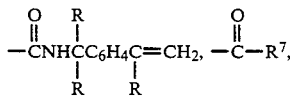

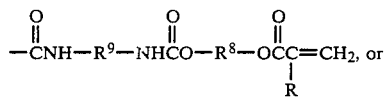

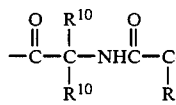

in which
R is hydrogen or a methyl group;
R⁷ is a monovalent organic radical having 1 to 24 carbon atoms and is selected from saturated or unsaturated straight or branched chain aliphatic groups and aromatic groups;
R⁸ is an alkylene group having 2 to 12 carbon atoms; and
R⁹ is a divalent organic group selected from linear, branched, and cyclic alkylene groups having 2 to 40 carbon atoms, phenylene groups, naphthylene groups, and phenylenemethylenephenylene groups, the organic group can be optionally substituted by up to four lower alkyl groups having 1 to 4 carbon atoms;
R¹⁰ is hydrogen or an alkyl group having 1 to 4 carbon atoms; and

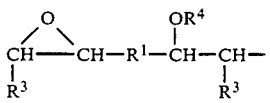

where R¹, R³, and R⁴ are as defined above and R¹² is a monovalent organic radical having 1 to 20 carbon atoms and is selected from saturated and unsaturated straight or branched chain aliphatic or aromatic groups;
R⁶ is selected from R¹¹ and

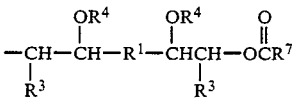

where R¹, R³, R⁴, R⁷ and R¹¹ are as defined above; n is a number having an average value of 1 to 100, preferably n is about 1 to 10, except that where

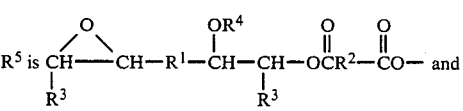 and

R⁶ is selected from hydrogen, $R^{12}$—CH—CH₂,

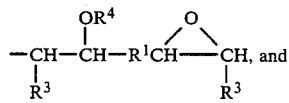

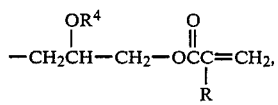

then n is a number having an average value of 0 to 100, preferably 0 to 10.

A preferred subclass of ethylenically unsaturated polyesters are those represented by the formula

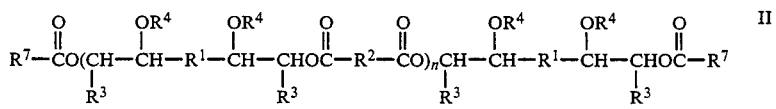

where R¹, R², R³ and R⁷ are as described above, each R⁴ is independently selected from hydrogen and

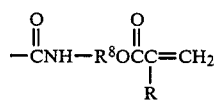

where R and R⁸ are as described above, and n is a number having an average value of 1 to 100, preferably 1 to 10.

The compounds of this invention are generally prepared in two steps. In the first step, a polyhydroxy polyester, such as that having the formula

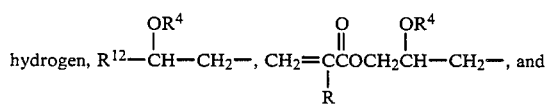

where R² and R⁷ are as defined above and R¹¹ is selected from

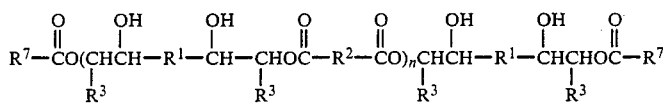

wherein $R^1$, $R^2$, $R^3$, $R^7$, and n are as defined for formula I, is prepared by the catalyzed, preferably chromic ion or tertiary amine catalyzed, reaction of n moles of dicarboxylic acid, $HOOCR^2COOH$, and 2 moles of a monocarboxylic acid, $HOOCR^7$, with n+1 moles of a diepoxide,

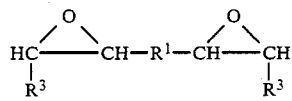

In the second step, the polyhydroxy polyester of the first step is reacted with a polymerizable ethylenically unsaturated compound having functional groups reactive with the hydroxyl groups of the hydroxy polyester.

The preparation of the ethylenically unsaturated polyester of this invention is illustrated in the following reaction schemes, where R, $R^1$ through $R^9$, and n are as defined above for general formula I. Scheme 1 illustrates the preparation of a polyhydroxy polyester intermediate I′ and scheme 2 shows the preparation of an ethylenically unsaturated polyester of general formula I. Scheme 3 illustrates the preparation of a polyhydroxy polyester intermediate II′, and schemes 4, 5 and 6 show the preparation of various examples of the ethylenically unsaturated polyester II from polyhydroxy polyester II′ by reaction with hydroxyl-reactive, unsaturated compounds.

Scheme 1

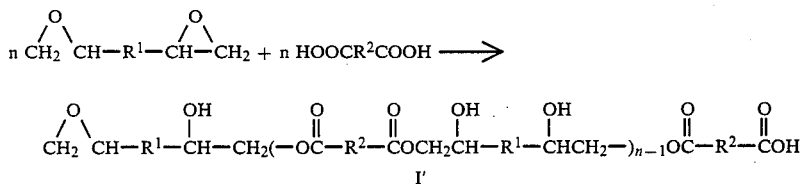

Scheme 2

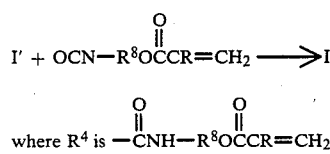

Scheme 3

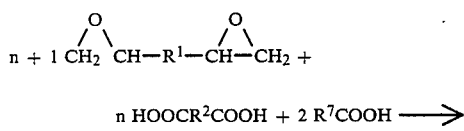

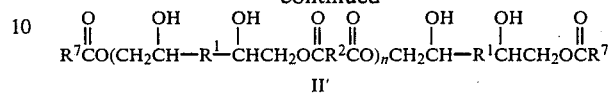

In the above schemes and formulas I and II, the oxirane rings of the diepoxide are shown as opening with the oxygen atom attached to the beta carbon. However, some oxirane rings may open such that the oxygen is attached at the alpha carbon.

Scheme 4

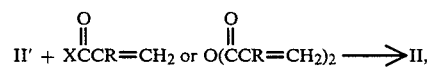

where $R^4$ is $-\overset{O}{\underset{\|}{C}}CR=CH_2$ and X is halogen or OH

Scheme 5

where $R^4$ is $-\overset{O}{\underset{\|}{C}}NH-R^8-O\overset{O}{\underset{\|}{C}}CR=CH_2$ Scheme 6

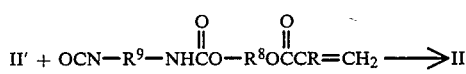

where $R^4$ is $-\overset{O}{\underset{\|}{C}}NH-R^9-NH\overset{O}{\underset{\|}{C}}O-R^8-O\overset{O}{\underset{\|}{C}}CR=CH_2$ In the first step, the reaction generally can be performed in the presence of a solvent for the reactants and an inhibitor for thermal polymerization of ethylenically unsaturated group-containing compounds by heating the reaction mixture at a temperature from 50° C. to 150° C., preferably about 70° C. to 100° C. Heating for 2 to 40 hours usually suffices to complete the reaction. Diepoxides,

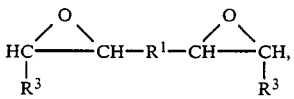

where $R^1$ and $R^3$ are as defined for formula I, that can be used in preparing the compounds of the invention are branched or straight chain aliphatic, cycloaliphatic, or aromatic compounds having two oxirane groups and a molecular weight of up to about 1000. The divalent organic radical, $R^1$, can be substituted with non-interferring groups and can contain catenary —O—,

or $SO_2$, provided no heterocyclic groups are present. The term "no heterocyclic groups" means those cyclic groups which are present are carbocyclic, that is, they have only carbon atoms in the ring structure, usually 5 or 6, e.g.,

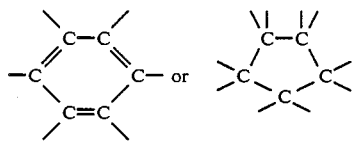

Particularly useful are the glycidyl ethers of dihydric alcohols. Included among the diepoxides that can be used are the diglycidyl ether of bisphenol A, poly(glycidyl bisphenol), 3,4-epoxycyclohexylmethyl-3,4-epoxycyclohexanecarboxylate, 3,4-epoxy-6-methylcyclohexylmethyl 3,4-epoxy-6-methylcyclohexanecarboxylate, bis(3,4-epoxy-6-methylcyclohexylmethyl)adipate, dipentene oxide, 1,4-butanediol diglycidyl ether, and resorcinol diglycidyl ether. Particularly preferred is the diglycidyl ether of bisphenol A,

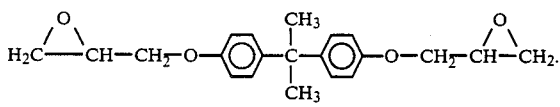

Commercially available diepoxides that can be used include diglycidyl ether of bisphenol A (e.g., Epon ™ 828, Shell Chemical Co., and DER ™ 332, Dow Chemical Co.), poly(glycidyl bisphenol) (e.g. Epon# 1002, Shell Chemical Co.) vinylcyclohexene dioxide (e.g., ERL ™-4206, Union Carbide Corp.), 3,4-epoxycyclohexylmethyl 3,4-epoxycyclohexanecarboxylate (e.g., ERL ™-4221, Union Carbide Corp.) 3,4-epoxy-6-methylcyclohexylmethyl 3,4-epoxy-6-methylcyclohexanecarboxylate (e.g., ERL ™-4201, Union Carbide Corp.), bis(3,4-epoxy-6-methylcyclohexylmethyl)adipate (e.g., ERL ™-4289, Union Carbide Corp.), aliphatic epoxy modified with polypropylene glycol (e.g., ERL ™-4050 and ERL ™-4052, Union Carbide Corp.), dipentene dioxide (e.g., ERL ™-4269, Union Carbide Corp, and Oxiron ™ 2001, FMC Corp.), and 1,4-butanediol diglycidyl ether (e.g., Araldite ™ RD-2, Ciba-Geigy).

Dicarboxylic acids that can be used in the practice of this invention can be represented by the formula

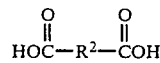

where $R^2$ is as defined for formula I. The dicarboxylic acids can be saturated or unsaturated, aliphatic, cycloaliphatic, or aromatic, and can be substituted optionally by non-interfering groups such as saturated alkyl, unsaturated alkyl, sulfonate, ester, ether, halohydrocarbon, amide, and carbamate. Examples of suitable dicarboxylic acids include: succinic, glutaric, adipic, suberic, sebacic, undecanedicarboxylic, hexadecanedicarboxylic, dimerized fatty acids (such as obtained by the dimerization of olefinically unsaturated monocarboxylic acids containing 16 to 20 carbon atoms such as oleic acid, linoleic acid and the like). Other useful dicarboxylic acids are diglycolic, dilactic, 3,3'-(ethylenedioxy)dipropionic, phthalic, isophthalic, terephthalic, 5-sulfonatoisophthalic, diphenic, maleic, fumaric, itaconic, phenylenediacetic, benzylsuccinic, 1,4-naphthalenedicarboxylic, 5-chloro-1,3-benzenedicarboxylic, tetrachlorophthalic, 1,2-cyclohexanedicarboxylic, 2,4-pyridinedicarboxylic, 2,5-tetrahydrofuranedicarboxylic, 1,5-pent-2-enedioic, 2-methyleneglutaric, 2-methyleneadipic, 3-methylitaconic, 3,3-dimethylitaconic and mixtures thereof. The preferred dicarboxylic acids are the alpha methylene dicarboxylic acids, particularly itaconic acid.

Monocarboxylic acids that can be optionally used in the practice of this invention have the formula

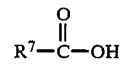

where $R^7$ is as defined for formula I. The monocarboxylic acids may be saturated or unsaturated, aliphatic, cycloaliphatic, or aromatic and may be substituted by non-interfering groups such as saturated alkyl, unsaturated alkyl, heterocyclic, sulfonate, ester, ether, halohydrocarbon, amide and carbamate. Examples of such monocarboxylic acids include: acetic, propionic, butanoic, valeric, hexanoic, octanoic, undecanoic, hexadecanoic, tetracosanoic, acrylic, methacrylic, crotonic, 2-butenoic, 3-hexenoic, undecylenic, oleic, nervonic, benzoic, phenylacetic, 4-chlorobenzoic, 4-trifluoromethylbenzoic and 4-methoxycarbonylbenzoic acid. Preferred monoacids are the alpha,beta-unsaturated carboxylic acids, particularly acrylic and methacrylic.

Monoepoxides that can be optionally used in the pratice of this invention have the formula

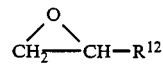

wherein $R^{12}$ is as defined above. The monoepoxides can be saturated or unsaturated aliphatic, cycloaliphatic, or aromatic and can be substituted with noninterfering groups and can contain catenary —O—,

and —$SO_2$. Examples include glycidyl ethers of monohydric alcohols, glycidyl esters of monocarboxylic acids or olefin monoepoxides, including the glycidyl esters of acrylic and methacrylic acid, the glycidyl ether of butanol, and styrene oxide.

In the second step of the preparation of the ethylenically unsaturated polyester compositions of the invention, the polyhydroxy polyester product of the first step is reacted with a sufficient amount of the polymerizable ethylenically unsaturated compound having functional groups reactive with hydroxyl groups of the polyhydroxy polyester to provide a polyester preferably having an equivalent weight of less than about 330 per polymerizable ethylenic group. Such functional groups reactive with hydroxyl groups include carboxylic acid, carboxylic acid chloride, carboxylic acid anhydride, and isocyanate. Preferred of such compounds are acrylic, methacrylic, and crotonic acid, acrylic, methacrylic, and crotonic acid chloride, acrylic, methacrylic, crotonic, and maleic anhydride, N-methylolacrylamide, N-alkoxymethylacrylamide, and ethylenically unsaturated azlactones. Isocyanatoalkyl acrylates and methacrylates and ethylenically unsaturated azlactones are more preferred. Examples of the most preferred isocyanatoalkyl acrylates and methacrylates are 2-isocyanatoethyl acrylate, 3-isocyanatopropyl acrylate, 3-isocyanatopropyl methacrylate, and 2-isocyanatoethyl methacrylate. Also among the polymerizable ethylenically unsaturated compounds are the reaction product of one mole of hydroxyalkyl acrylate or methacrylate and one mole of a straight or branched aliphatic, cycloaliphatic, or aromatic or alkenylaromatic diisocyanate such as 2-(4-isocyanatophenylaminocarbonyloxy)ethyl acrylate and methacrylate, 2-(3-isocyanato-4-methylphenylaminocarbonyloxy)ethyl acrylate, 2-(5-isocyanato-1,3,3-trimethylcyclohexylmethylaminocarbonyloxy)ethyl acrylate and methacrylate, 2-(1-methyl-1-(4-(1-methyl-1-isocyanatoethyl)phenyl)ethylaminocarbonyloxy)ethyl acrylate or methacrylate, 2-(1-methyl-1-(3-(1-methyl-1-isocyanatoethyl)phenyl)ethylaminocarbonyloxy)ethyl acrylate or methacrylate, and 2-(6-isocyanatohexylaminocarbonyloxy)ethyl acrylate and methacrylate which are the reaction product of 1,4-benzene diisocyanate, 2,4-toluene diisocyanate, 5-isocyanato-1,3,3-trimethylcyclohexylmethyl isocyanate, 1,4-bis(1-methyl-1-isocyanatoethyl)benzene, 1,3-bis-(1-methyl-1-isocyanatoethyl)benzene and 1,6-hexane diisocyanate with 2-hydroxy-ethyl acrylate and methacrylate, respectively. Examples of the preferred ethylenically unsaturated azlactones are 2-ethenyl-1,3-oxazoline-5-one, 2-ethenyl-4,4-dimethyl-1,3-oxazolin-5-one, 2-isopropenyl-4,4-dimethyl-1,3-oxazolin-5-one, and 2-isopropenyl-4-methyl-4-dodecyl-1,3-oxazolin-5-one.

Optionally, the polyhydroxy polyester can be reacted with a non-ethylenically unsaturated compound having a functional group reactive with the hydroxyl group of the polyhydroxy polyester. This further substitution can alter the solubility or compatibility of the unsaturated polyester. Examples of non-ethylenically unsaturated compounds include isocyanates such as butyl isocyanate, octadecyl isocyanate, phenyl isocyanates, acid halides and anhydrides such as benzoyl chloride, oleylchloride, butyryl anhydride, succinic anhydride, and para-toluene sulfonyl chloride.

Since the ethylenically unsaturated polyester composition is preferably used as a coating composition, the solvents used in the first step, in which the polyhydroxy polyester is prepared, preferably have a boiling point at atmospheric pressure of less than about 200° C. so that the solvents are readily volatilized from a coating of the composition, and have a boiling point of at least 50° C. so that the temperature at which the polyhydroxy polyester and the ethylenically unsaturated polyester are prepared can be at least 50° C. without the use of pressure equipment. The preparation reactions can be carried out in pressure equipment, if desired, under pressures of several atmospheres or more. Most solvents having an atmospheric boiling point within the range of 50° to 200° C. can be used provided they do not have interfering groups, e.g., carboxylic acid groups, which would interfere by reaction with an epoxy group, or hydroxyl groups which would interfere during the second step of the reaction. It is preferred that solvents be selected from esters, ketones, or aromatic hydrocarbons such as butyl acetate, cellosolve acetate, methyl isobutyl ketone, and xylene. Generally, in the first step of the reaction, the amount of solvent results in a solution containing up to 100 percent solids, preferably about 50 to 80 percent solids, the higher solids contents used where the molecular weight of the resulting polyhydroxy polyester is low, and in the second step, the amount of solvent results in a solution containing up to about 80 percent reactive material, preferably about 50 to 70 percent reactive material.

Use of thermal inhibitors in compositions containing ethylenically unsaturated groups is well known and such inhibitors are used in amounts up to about 0.02 percent by weight of the composition exclusive of solvents. Examples of useful thermal inhibitors are quinone, naphthoquinone, hindered phenols, and hydroquinone monoalkyl ethers. Generally, there is present in the commercially obtained ethylenically unsaturated compounds sufficient inhibitor to prevent thermal polymerization during synthesis.

The ethylenically unsaturated polyesters of the invention that have been prepared to have an equivalent weight of less than about 330 per ethylenic group present in the dicarboxylic acid groups $R^2$, the terminal groups $R^5$ and $R^6$, and the pendant groups $R^4$, are responsive to polymerization even in the presence of oxygen when subjected to heat or actinic radiation in the presence of a source of free radicals. With equivalent weight per ethylenic group increasing above 330, polymerization proceeds more and more slowly and the resistance to scratching of a substrate coated with the polymerized product becomes increasingly reduced.

The radiation polymerizable compositions of the invention contain a polyester backbone with pendant groups having polymerizable ethylenic unsaturation. The compositions also preferably contain sufficient polymerization initiators for bringing about polymerization on exposure of the composition to actinic radiation.

Polymerization initiators suitable for use in the crosslinkable compositions of the invention are those compounds which liberate or generate a free-radical on addition of energy. Such catalysts include peroxy, azo, and redox systems all of which are well known and are described frequently in polymerization art. Included among free-radical catalysts are the conventional heat-activated catalysts such as organic peroxides and organic hydroperoxides, e.g., benzoyl peroxide, tertiary-butyl perbenzoate, cumene hydroperoxide, azobis(isobutyronitrile) and the like. The preferred catalysts are photopolymerization initiators which facilitate polymerization when the composition is irradiated. Included among such initiators are acyloin and derivatives thereof, such as benzoin, benzoin methyl ether, benzoin ethyl ether, benzoin isopropyl ether, benzoin isobutyl ether, and methylbenzoin, diketones such as benzil and diacetyl etc.: phenones such as acetophenone, 2,2,2-tribromo-1-phenylethanone, 2,2-diethoxyacetophenone, 2,2-dimethoxy-2-phenylacetophenone, 2,2,2-tribromo-1-(2-nitrophenyl)ethanone, benzophenone, and 4,4'-bis(dimethylamino)benzophenone. Normally, the initiator is used in amounts ranging from about 0.01 to 10% by weight of the total polymerization composition. When the quantity is less than 0.01% by weight, the polymerization rate becomes extremely low. If the initiator is used in excess of 5% by weight, no correpondingly improved effect can be expected. Thus addition of such greater quantity is economically unjustified. Preferably, about 0.25 to 4.0% of initiator is used in the polymerizable composition.

The polyester compositions of the invention can optionally be blended with ethylenically unsaturated materials to modify or enhance the properties of the polyester, e.g., hardness, flexibility, and adhesion. Such materials may also be used as reactive diluents. Ethylenically unsaturated monomers suitable for formulations with the polyesters include methyl methacrylate, ethyl acrylate, 2-ethylhexyl acrylate, chlorohexyl acrylate, styrene, 2-chlorostyrene, 2,4-dichlorostyrene, acrylic acid, acrylamide, acrylonitrile, t-butyl acrylate, methyl acrylate, butyl acrylate, 2-(N-butylcarbamyl)ethyl methacrylate and 2-(N-ethylcarbamyl)ethyl methacrylate. Other modifying monomers that can be incorporated into the composition of the invention include 1,4-butylene dimethacrylate or diacrylate, ethylene dimethacrylate, hexanediol diacrylate or dimethacrylate, glyceryl diacrylate or dimethacrylate, glyceryl triacrylate or trimethacrylate, pentaerythritol triacrylate or trimethacrylate, pentaerythritol tetraacrylate or tetramethacrylate, diallyl phthalate, dipentaerythritol pentaacrylate, neopentylglycol diacrylate, and 1,3,5-tri(2-methacryloyloxyethyl)-s-triazine. In addition to the reactive monomers, other polymerizable ethylenically unsaturated coreactants can be blended with the polyesters of the invention. Such coreactants include acrylated epoxy, acrylated urethane, and acrylated cellulose oligomers and resins. Generally, up to about one part of modifying materials per part by weight of ethylenically unsaturated polyester can be used. Also, small amounts of non-reactive film-forming resins, such as nitrocellulose, can be added.

The ethylenically unsaturated polyester compositions of the invention can also include variety of additives utilized for their known purpose, such as stabilizers, inhibitors, lubricants, flexibilizers, pigments, dyes, and fillers such as diatomaceous earth, metal oxides, fiberglass, glass bubbles, and talc. Fillers can generally be used in proportions up to about 200 percent by weight of the curable composition but preferably are used up to about 50 percent by weight. Where the polymerizing energy is radiation, it is desirable that the additives be transparent to the radiation.

Coating compositions of the invention can be prepared by simply mixing (under "safe light" conditions if the composition is to be sensitized to visible light) the ethylenically unsaturated polyesters of the invention, with the polymerization catalyst and initiator (where used), and where used, the modifying monomers, binders and other additives. Where the polymerization catalyst is a photoinitiator, the composition can be used for in situ curing process because of the insensitivity to oxygen.

The ethylenically unsaturated polyesters of the invention can be used as adhesives, caulking and sealing compositions, casting and molding compositions, potting and encapsulating compositions, impregnating compositions, and binders. The photopolymerizable compositions are particularly suitable for applications in the field of protective coatings, e.g., furniture finishes, and graphic arts, because of their superior abrasion resistance, heat resistance, and adhesion to many rigid, resilient and flexible substrates, such as metal, plastic, rubber, glass, paper, wood and ceramic. Their excellent resistance to most solvents and chemicals and their capability for forming high resolution images provide further advantages in coatings and graphic arts. Among such uses are developable resists for chemical milling, gravure images, offset plates, stencil making, screenless lithography, relief printing plates, printed circuits, radiation-cured protective coatings for glass, metal surfaces and the like. Also, the polyesters of the invention are form-stable at room temperatures (they do not flow at temperatures below about 30° C.), and many are non-tacky at these temperatures.

The polymerization of photopolymerizable compositions of the invention occurs on exposure of the compositions to any source of radiation emitting actinic radiation at a wavelength within the ultraviolet and visible spectral regions. Suitable sources of radiation include mercury, xenon, carbon arc and tungsten filament lamps, sunlight, etc. Exposures may be from less than about 1 second to 10 minutes or more, depending upon the amounts of the particular polymerizable materials present, the photopolymerization catalyst being utilized as well as the radiation source, distance from the source, and the thickness of the coating to be cured. The compositions may also be polymerized by exposure to electron beam irradiation. Generally, the dosage is from less than 1 megarad to 30 megarad or more. One of the major advantages using electron beam curing is that highly pigmented compositions can be effectively cured at a faster rate than by mere exposure to actinic radiation.

Compositions of the invention that contain a thermally activated polymerization initiator are polymerized by heating the composition in a suitable mold or as a layer on a substrate to a temperature at which the initiator is activated, generally from about 30° C. to 150° C. for from a few minutes to 24 hours or more, depending on the particular activator used and its concentration.

The cured product of the invention is an insoluble or crosslinked material derived from the polyester by the free radical polymerization of the ethylenically unsaturated groups of the polyester of the invention.

The instant invention will be illustrated by referring to the following specific but nonlimiting examples.

In these examples, the following tests were used to evaluate the coatings.

Abrasion Resistance: A sample of polyester film having a cured coating of the ethylenically unsaturated polyester composition is abraded using a Taber Abraser ™ (available from Gardner Neotech Co.) equipped with CS 17 wheels under a 500 gram load for 30 cycles. The haze value, a parameter inversely proportional to abrasion resistance, of the abraded sample is measured using a Gardner Hazemeter Model No. UX10 (available from Gardner Neotech Co.). Haze values below about 6.5 are preferred.

Heat Resistance: Heat resistance is measured using a test referred to as the "hot cup print test", a modification of the Boiling Water Resistantce Test (NEMA Standard LDI-202). A single layer of cheesecloth (8 cm×8 cm) wet with water is placed on a polyester film having a cured coating of the ethylenically unsaturated polyester composition, an 800 ml aluminum beaker containing 650 ml of boiling water is placed on the wet cheese cloth and allowed to stand for 20 minutes. The beaker and cheese cloth are removed, the film is wiped dry and inspected for print-through from the cheese cloth.

Solvent Resistance: A cotton ball is saturated with the solvent being tested and is placed on the surface of a polyester film having a cured coating of the ethylenically unsaturated polyester composition. The solvent-saturated cotton ball is covered with a watch glass (or other cover) to retard solvent evaporation. The covered sample is allowed to stand at room temperature, with additional solvent added if necessary, to maintain wetness of the cotton ball. After time periods of 10 minutes, 30 minutes, 60 minutes, and each hour thereafter for 6 hours, the cover and cotton ball are removed, the surface is wiped dry and the sample surface is visually inspected for any change in surface appearance.

EXAMPLE 1

A 2-liter, 3-necked flask equipped with a mechanical stirrer, dry air bubbler, and condenser with drying tube was charged with 350 g DER TM 332 (diglycidyl ether of bisphenol A having an epoxide equivalent weight of 175 available from Dow Chemical Co.), 1.0 mole;
97.6 g itaconic acid, 0.75 mole;
36.0 g acrylic acid, 0.5 mole;
322 g butyl acetate; and
1.0 ml Cordova Accelerator AMC-2 (an organic soluble chromium salt available from Cordova Chemical Company).

A flow of about 5 ml/min of dry air was established through the solution and it was stirred for about 8 to 12 hours at 80° C. Progress of the reaction was monitored by withdrawal of 1 g. samples of solution that were titrated for residual epoxy and acid respectively. Heating of the solution was continued until residual epoxide level fell to less than 3% and the acid level fell to less than 5% of the initial charge, at which time the solution was cooled to room temperature. A solution in butyl acetate of a polyhydroxy polyester having a ratio of 4 moles diepoxide: 3 moles itaconic acid: 2 moles acrylic acid was obtained.

To the polyhydroxy polyester solution was added 279.3 g of isocyanatoethyl methacrylate (IEM, 1.8 moles 90% of the theoretical amount required to react with all of the hydroxyl group) 186 g butyl acetate, and 0.34 ml dibutyltin dilaurate (DBTDL, available from Alpha Chemical Company).

Stirring and maintaining a dry air flow through this solution was re-established and it was brought to 70° C. After about 12 hours, the solution was monitored for the presence of free isocyanate by infrared spectroscopy; heating was continued until isocyanate functionality was absent (12 to 16 hours). On cooling, there was obtained an approximately 60% solution of an ethylenically unsaturated polyester of this invention having a calculated ethylenic equivalent weight of 245.

A portion of the solution obtained was diluted to 20% solids by weight and 7.0% by weight (based on solids) of "Irgacure" 184 (a photoinitiator available from Ciba Geigy Co.) was added and mixed until dissolved. The resulting mixture was coated onto polyester film using a No. 50 wirewound bar coater. The coated samples were air dried for about 18 hours at room temperature (about 25° C.). The samples were cured by passing twice through a RPC UV Processor, Model No. QC 1202 (manufactured by PPG Industries, Inc.). The processor had two 300 watts/inch (120 watts/centimeter) lamps and was operated at a belt speed of 9.1 meters/minute. Clear, colorless, cured (crosslinked) coatings were obtained. This coating was solvent resistant for at least 6 hours to amyl acetate, acetone, 95% ethanol, 50% ethanol, water, and 5% aqueous ammonia. The haze value was 4.2% and no print-through was observed after the hot cup print test.

EXAMPLES 2-11 AND COMPARATIVE EXAMPLE 1

Solutions of ethylenically unsaturated polyester of this invention were prepared, coated onto polyester film and cured as described in Example 1 with the exception that only 4% "Irgacure" 184 was used and the ratios of diepoxide, itaconic acid and acrylic acid and percent of the theoretical amount of isocyanatoethyl methacrylate required to react with the hydroxyls present in the polyhydroxy polyester are as shown in Table I. Clear colorless coatings that were as abrasion, heat and solvent resistant as the coatings of Example 1 were obtained in Examples 2-11. Table I also shows the calculated molecular weight and calculated ethylenic unsaturated equivalent weight as well as the haze found for each polyester. Comparative Example 1 was prepared as in Example 1 using diepoxide, itaconic acid, and acrylic acid, but omitting the addition of isocyanatoethyl methacrylate.

TABLE I

| EX. NO. | MOLE RATIO OF REACTANTS D/I/A$^{(a)}$ | IEM$^{(b)}$ (%)$^{(c)}$ | CALCULATED MW$^{(d)}$ | EUE$^{(e)}$ | HAZE % |
|---|---|---|---|---|---|
| 1 | 4/3/2 | 7.2(90) | 3010 | 245 | 4.2 |
| 2 | 4/3/2 | 4.8(60) | 2640 | 270 | 5.5 |
| 3 | 4/3/2 | 2.4(30) | 2265 | 305 | 5.5 |
| 4 | 2/1/2 | 3.6(90) | 1510 | 230 | 4.7 |
| 5 | 2/1/2 | 2.4(60) | 1325 | 245 | 4.7 |
| 6 | 2/1/2 | 1.2(30) | 1140 | 270 | 5.4 |
| 7 | 2/1/2$^{(f)}$ | 3.6(90) | 1540 | 235 | 5.6 |
| 8 | 5/4/2 | 9.0(90) | 3760 | 250 | 4.3 |
| 9 | 10/9/2 | 18(90) | 7505 | 260 | 4.4 |
| 10 | 40/39/2 | 72(90) | 19,200 | 265 | 4.5 |
| 11 | 1/1/0 | 1.8(90) | 30,000$^{(g)}$ | 270 | 4.1 |
| Comp. 1 | 4/3/2 | 0(0) | 1890 | 380 | 7.0 |

$^{(a)}$Ratio: diglycidyl ether of bisphenol A/itaconic acid/acrylic acid
$^{(b)}$IEM is isocyanatoethyl methacrylate
$^{(c)}$Percent of theoretically available hydroxyl groups
$^{(d)}$Number average molecular weight
$^{(e)}$Ethylenic unsaturation equivalent weight
$^{(f)}$Methacrylic acid used in place of acrylic acid
$^{(g)}$Degree of polymerization: n~60

It is to be observed in Table I that cured coatings prepared from 2/1/2 to 40/39/2 diepoxide/itaconic acid/acrylic acid and 30 to 90% of the theoretical amount of isocyanatoethyl methacrylate are abrasion resistant having an abrasion resistance as expressed by haze values lower than 6.5% and as low as 4.2%. A cured coating when prepared from 1/1 diepoxide/itaconic acid even without acrylic acid had an abrasive resistance as expressed by haze value of 4.1%. The samples showed excellent solvent resistance and heat resistance because no effect on the samples of Examples 1-11 and Comparative Example 1 could be observed after contacting the coatings for at least 6 hours with amyl acetate, acetone, 95% ethanol, 50% ethanol, water, or 5% aqueous ammonia, or after subjecting the samples to the hot cup print test. The coating of Comparative Example 1, having an ethylenic unsaturation equivalent weight of 380, exhibited a haze value of 7.0 which haze value is above the desired haze value.

EXAMPLES 12-13 AND COMPARATIVE EXAMPLES 2-5

Solutions of ethylenically-unsaturated polyester were prepared, coated onto polyester film, and cured by the procedures described in Example 1 using the reactants shown in Table II. The cured coatings of the invention in Examples 12 and 13 were clear, colorless coatings and were abrasion resistant as shown by the haze values in Table II, were heat resistant exhibiting no print-through after the hot cup print test, and were solvent resistant, being unaffected by exposure to amyl acetate, acetone, 95% ethanol, 50% ethanol water, or 5% aqueous ammonia for 6 hours. The cured coatings of Comparative Examples 2-5 did not exhibit acceptable abrasion resistance, but were resistant to heat and solvents.

TABLE II

| EX. NO. | MOLE RATIO OF REACTANTS | | CALCULATED | | HAZE (%) |
| --- | --- | --- | --- | --- | --- |
| | D/S/A$^{(a)}$ | IEM$^{(b)}$ (%)$^{(c)}$ | MW$^{(d)}$ | EUE$^{(e)}$ | |
| 12 | 2/1/2 | 3.6(90) | 1500 | 270 | 4.5 |
| 13 | 4/3/2 | 7.2(90) | 2975 | 325 | 6.5 |
| Comp 2 | 4/3/2 | 4.8(60) | 2600 | 380 | 7.5 |
| Comp 3 | 4/3/2 | 2.4(3) | 2230 | 505 | 10.5 |
| Comp 4 | 4/3/2 | 0(0) | 1860 | 930 | 26 |
| Comp 5 | 1/1/0 | 1.8(90) | 30,000$^{(f)}$ | 410 | 7.5 |

$^{(a)}$Ratio: diglycidyl ether of bisphenol A/succinic acid/acrylic acid
$^{(b)}$IEM is 2-isocyanatoethyl methacrylate
$^{(c)}$Percent of theoretically available hydroxyl groups
$^{(d)}$Number average molecular weight
$^{(e)}$Ethylenic-unsaturation equivalent weight
$^{(f)}$Degree of polymerization: n~65

In Table II, it can be observed that the cured coatings of polyesters containing a calculated ethylenic unsaturation equivalent weight (EUE) of less than 330 have excellent abrasion resistance, vis., a haze value of no more than 6.5, whereas the comparative cured coatings prepared from polyesters having an equivalent weight of above 330, have inferior abrasion resistance.

EXAMPLE 14

The procedure of Examples 2-11 was repeated to prepare another polyester of this invention using in place of the aromatic diepoxide 280 g of the cycloaliphatic diepoxide ERL TM 4221 (3,4-epoxy-cyclohexylmethyl 3,4-epoxy cyclohexanecarboxylate, epoxy equivalent weight 140, available from Union Carbide Corp.). The polyester obtained had a ratio of 4 moles cycloaliphatic diepoxide: 3 moles of itaconic acid: 2 moles of acrylic acid with 90% of the hydroxyls reacted with IEM. The ethylenically unsaturated polyester obtained had a calculated molecular weight of 2660 and equivalent weight of 220 per ethylenic double bond. Coatings prepared and cured as described in Examples 2-11 were colorless, abrasion and heat resistant, and were uneffected by contact with amyl acetate, acetone, 95% ethanol, 50% ethanol, water, and 5% aqueous ammonia for 6 hours.

EXAMPLE 15

The procedure of Examples 2-11 was repeated to prepare another polyester of the invention using 48.8 g itaconic acid (0.375 moles) and 62.30 g phthalic acid (0.375 moles) in place of 0.75 mole itaconic acid. The polyester obtained had a ratio of 4 moles of diepoxide: 3 moles of dicarboxylic acid: 2 moles of acrylic acid with 90% of the hydroxyls reacted with isocyanatoethyl methacrylate. The ethylenically unsaturated polyester obtained had a calculated molecular weight of 3065 and an EUE of 285. Coatings prepared and cured as described in Examples 2-11 were colorless and abrasion and heat resistant. No effect on the cured coatings could be observed after they had been contacted for at least 6 hours by amyl acetate, acetone, 95% ethanol, 50% ethanol, water, or 5% aqueous ammonia.

EXAMPLE 16

The procedure of Example 1 was repeated to prepare another polyester of the invention using 30 g acetic acid (0.5 mole) in place of 0.5 mole of acrylic acid. The ethylenically unsaturated polyester obtained had a calculated molecular weight of 2985 and an EUE of 293. A coating prepared and cured as described in Example 1 was colorless, abrasion, heat, and solvent resistant.

When Example 16 was repeated using 0.5 mole of hexanoic acid, the ethylenically unsaturated polyester had a calculated molecular weight of 3100 and an EUE of 305. Coatings similar to those of Example 16 are obtained.

Various modifications and alterations of this invention will become apparent to those skilled in the art without departing from the scope and spirit of this invention.

It is claimed:

1. Ethylenically unsaturated polyester comprising the reaction product of (a) a polyhydroxy polyester which is the addition or condensation product of a saturated or unsaturated dicarboxylic acid and an acyclic or carboxylic organic diepoxide, with (b) polymerizable ethylenically unsaturated compound having a functional group reactive with the hydroxyl groups of the polyhydroxy polyester, said ethylenically unsaturated polyesters having an equivalent weight of less than about 330 per ethylenic groups.

2. The polyesters of claim 1 further comprising monocarboxylic acid and/or monoepoxide.

3. The ethylenically unsaturated polyesters of claim 1 represented by the formula

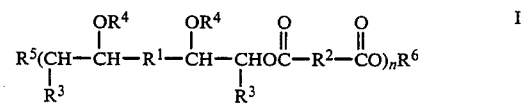

wherein
each R$^1$ and R$^2$ is independently a divalent organic group having 2 to 40 carbon atoms selected from saturated or unsaturated straight or branched aliphatic or cycloaliphatic groups or aromatic groups,
each R$^3$ is independently hydrogen or an alkylene group having 2 or 3 carbon atoms that together with atoms in R$^1$ and the —CH—CH— group to which it is bonded form a 5- or 6-membered trivalent cycloalkane group;

each R⁴ is independently —H, 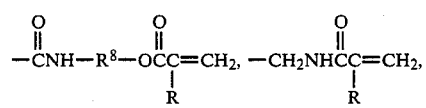

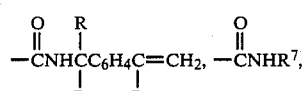

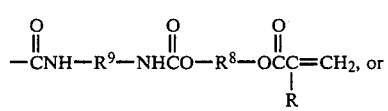

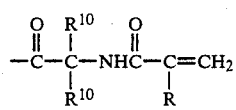

in which
R is hydrogen or a methyl group;
R⁷ is a monovalent organic radical having 1 to 24 carbon atoms and is selected from saturated or unsaturated straight or branched chain aliphatic groups and aromatic groups;
R⁸ is an alkylene group having 2 to 12 carbon atoms; and
R⁹ is a divalent organic group selected from linear branched, and cyclic alkylene groups having 2 to 20 carbon atoms, phenylene groups, naphthylene groups, and phenylenemethylenephenylene groups, the organic group optionally substituted by up to four lower alkyl groups having 1 to 4 carbon atoms;
R¹⁰ is hydrogen or an alkyl group having 1 to 4 carbon atoms; and
R⁵ is selected from

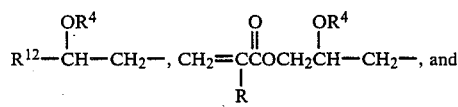 where R² and R⁷ are as defined above and R¹¹ is selected from hydrogen,

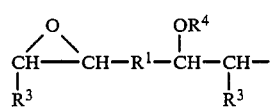 and

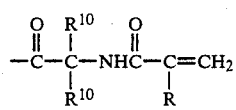

where R¹, R³, and R⁴ are as defined above and R¹² is a monovalent organic radical having 1 to 20 carbon atoms and is selected from saturated and unsaturated straight or branched chain aliphatic groups or aromatic groups;
R⁶ is selected from R¹¹ and

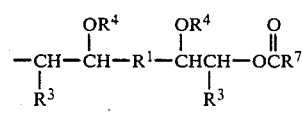

where R¹, R³, R⁴, R⁷ and R¹¹ are as defined above;
n is a number having an average value of 1 to 100, except where R⁵ is

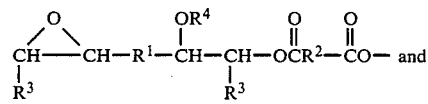 and

R⁶ is selected from hydrogen, R¹²—CH(OR⁴)—CH₂,

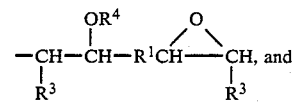

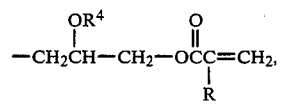

n may be a number having an average value of 0 to 100.

4. The ethylenically unsaturated polyesters of claim 2 wherein the polyhydroxy polyester is the reaction product of n+1 moles of diepoxide, n moles of dicarboxylic acid, and 2 moles of monocarboxylic acid in which n is a number having a value of 1 to 100.

5. The ethylenically unsaturated polyester of claim 3 having the formula

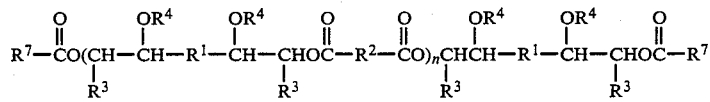

wherein
each R¹ and R² is independently a divalent organic group having 2 to 40 carbon atoms selected from saturated or unsaturated straight or branched aliphatic or cycloaliphatic groups or aromatic groups, with the proviso that R¹ contains no heterocyclic groups;
each R³ is independently hydrogen or an alkylene group having 2 or 3 carbon atom that together with atoms in R¹ and the —CH—CH— group to which it is bonded form a 5- or 6-membered trivalent cycloalkane group;
each R⁴ is independently

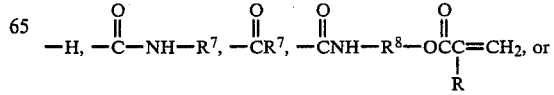

-continued

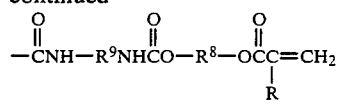

in which

R is —H or —CB₃;

R⁷ is a monovalent organic radical having 1 to 24 carbon atoms and is selected from saturated or unsaturated straight or branched chain aliphatic groups and aromatic groups;

R⁸ is an alkylene group having 2 to 12 carbon atoms; and

R⁹ is a divalent organic group selected from linear, branched, and cyclic alkylene groups having 2 to 40 carbon atoms, naphthylene groups and phenylenemethylenephenylene groups, the organic group optionally substituted by up to four lower alkyl groups having 1 to 4 carbon atoms; and n is a number having a value of 1 to 100 sufficient to provide to the ethylenically-unsaturated polyester a number average molecular weight of 500 to 30,000.

6. The polyester of claim 4 in which n has a value of 1 to 10.

7. The polyesters of claim 2 wherein the dicarboxylic acid is itaconic acid, the monocarboxylic acid is acrylic acid, the diepoxide is a diglycicyl ether of bisphenol A, and the ethylenically unsaturated compound is isocyanatoethyl methacrylate.

8. An ethylenically unsaturated polyester comprising the addition product of (1) the reaction product of 3 moles itaconic acid, 2 moles acrylic acid, and 4 moles of the diglycidyl ether of bisphenol A, and (2) 2.4 to 7.2 moles isocyanatoethyl methacrylate.

9. The process of preparing ethylenically unsaturated polyesters comprising the steps of
(1) preparing a polyhydroxy polyester by reacting n moles of organic dicarboxylic acid, 2 moles of a saturated or unsaturated monocarboxylic acid, and n+1 moles of diepoxide, where n is 1 to 100, and
(2) heating the polyhydroxy polyester of step (1) with sufficient polymerizable ethylenically-unsaturated compound having a functional group reactive with hydroxyl groups sufficient to provide to the polyester an equivalent weight of less than about 330 per ethylenic groups.

10. The process according to claim 9 wherein n has a value of 1 to 10.

11. The process according to claim 9 wherein the polyhydroxy polyester is prepared by reacting 4 moles of diepoxide, 3 moles of dicarboxylic acid, and 2 moles of monocarboxylic acid.

12. Coating composition comprising a solution of the ethylenically-unsaturated polyester as defined in claim 1 in an organic solvent.

13. The process of curing a composition as defined in claim 1 to a solvent, stain, heat, and abrasion resistant state comprising exposing the composition in the form of a coating on a substrate to effective activating energy.

14. Substrate having a cured coating of the polyester of claim 1.

15. Ethylenically unsaturated polyester comprising the reaction product (a) a polyhydroxy polyester which is the addition or condensation product of a saturated or unsaturated dicarboxylic acid that is aliphatic, cycloaliphatic, or aromatic and can be substituted by a non-interferring group and an organic diepoxide having a molecular weight of up to about 1000 that is branched or straight chain aliphatic, cycloaliphatic, or aromatic and can be substituted by a non-interfering group, with (b) polymerizable ethylenically unsaturated compound selected from acrylic and methacrylic halides, anhydrides, and isocyanates, N-methylolacrylamide, N-alkoxymethylacrylamide, and ethenyl and isopropenyl azlactones, said ethylenically unsaturated polyesters having an equivalent weight of less than about 330 per ethylenic groups and a number average molecular weight of 500 to 30,000.

16. The polyesters of claim 15 further reacted with a monocarboxylic acid that is aliphatic, cycloaliphatic, or aromatic and can be substituted by a non-interfering group, and/or monoepoxide that is saturated or unsaturated aliphatic, cycloaliphatic or aromatic and can be substituted with non-interferring groups and can contain catenary —O—,

and —SO₂— groups.

* * * * *

UNITED STATES PATENT AND TRADEMARK OFFICE
CERTIFICATE OF CORRECTION

PATENT NO. : 4,567,237
DATED : January 28, 1986
INVENTOR(S) : Gilbert C. Johnson and Heather V. Landin It is certified that error appears in the above-identified patent and that said Letters Patent is hereby corrected as shown below:

Col. 7, line 52, "Epon #" should read -- Epon$^{TM}$ -- .

Col. 8, line 66, "-SO$_2$." should read -- -SO$_2$-. --

Col. 11, line 49, insert -- a -- after include.

Col. 16, line 42, "carboxylic" should read -- carbocyclic -- .

Signed and Sealed this

Twenty-eighth Day of October, 1986

[SEAL]

Attest:

DONALD J. QUIGG

Attesting Officer      Commissioner of Patents and Trademarks